United States Patent Office 2,786,687
Patented Mar. 26, 1957

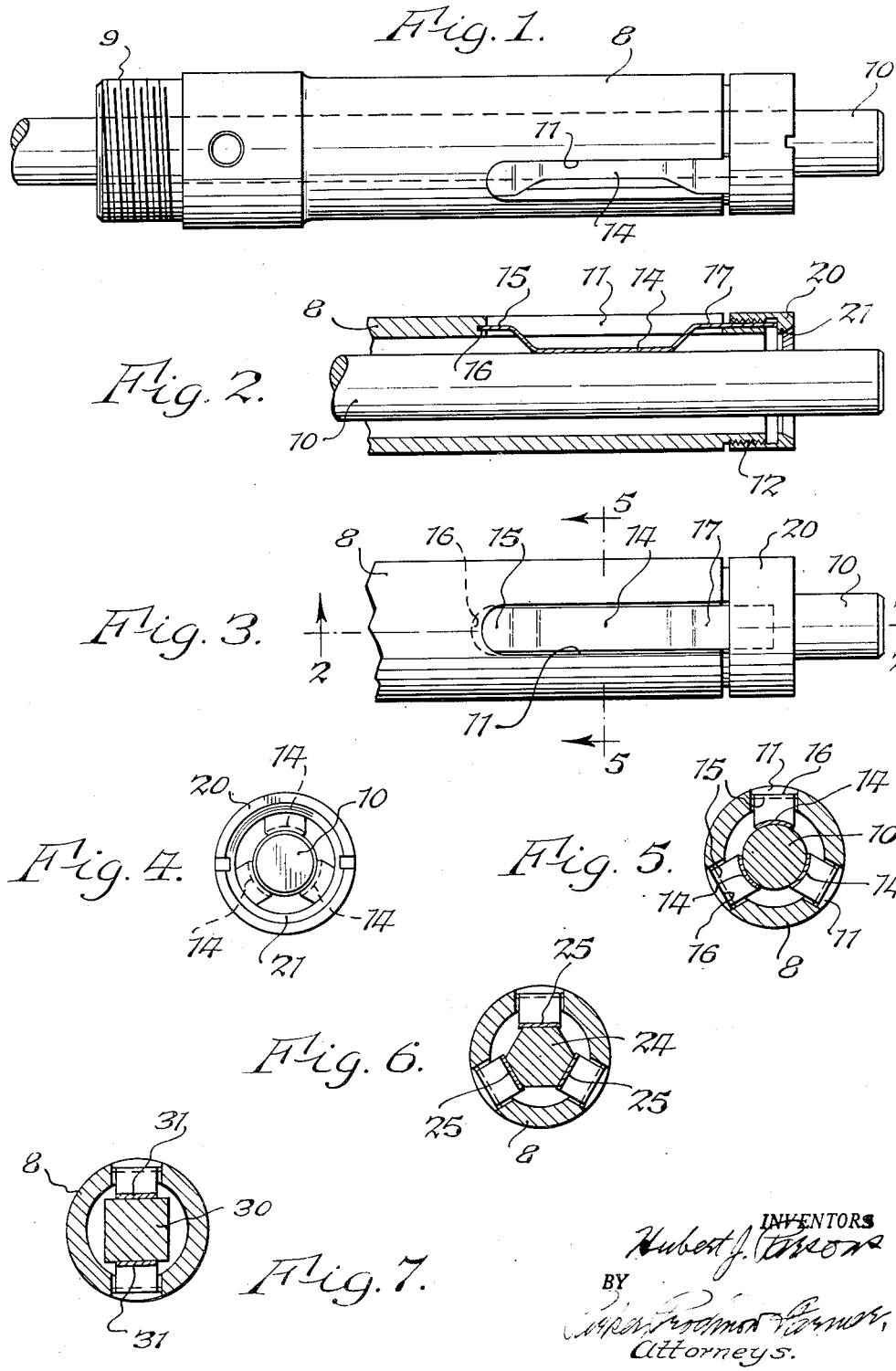

2,786,687

FEED CHUCKS

Hubert J. Parsons, Horseheads, N. Y., assignor to Hardinge Brothers, Inc., Elmira, N. Y.

Original application August 25, 1954, Serial No. 452,052. Divided and this application September 8, 1955, Serial No. 533,315

7 Claims. (Cl. 279—23)

This invention relates to improvements in feed chucks or feed fingers of the kind commonly used for advancing the work in automatic screw machines, lathes, or the like. More particularly this invention relates to feed chucks of the type commonly referred to as "squirrel cage" feed chucks.

Feed chucks of this type have generally been made by providing a tubular member with longitudinally extending slots terminating in spaced relation to the ends of the member and having the metal between the slots bent inwardly toward the axis of the tubular member into positions to engage the stock to be fed. These inwardly projecting parts when worn by contact with the stock so that they failed to properly grip the stock, were forced inwardly to a greater extent, generally by hammer blows, which involved the difficulty of forcing each of the inwardly extending parts toward the axis to the same extent, as is necessary for the efficient operation of the feed chuck.

One of the objects of this invention is to provide a feed chuck of this type in which the inwardly extending parts are in the form of separate springs removably secured to the feed collet so that they can be removed and replaced when worn or replaced by other springs formed to cooperate with stock of different diameter or cross sectional shape. Another object is to provide a feed chuck of this type in which the inwardly extending springs may be bowed to varying degrees by means of pressure applied to the ends of the springs. It is also an object of this invention to provide a feed chuck in which the inwardly extending springs are all moved simultaneously toward and from the axis of the feed chuck so that all of the springs will exert substantially the same pressure on the stock. A further object is to provide a feed chuck of this type with a nut or threaded sleeve formed to engage one end of each spring member for the purpose of bowing the springs into the feed chuck to a greater or less extent and in which the springs serve simultaneously for the purpose of locking the sleeve or nut in its adjusted positions.

Other objects and advantages will be apparent from the following description of one embodiment of the invention and the novel features will be particularly pointed out hereinafter in connection with the appended claims.

In the accompanying drawings:

Fig. 1 is a side view of a feed chuck or finger embodying this invention showing the same holding stock in the form of a rod.

Fig. 2 is a fragmentary central sectional elevation thereof, on line 2—2, Fig. 3.

Fig. 3 is a fragmentary side view of the discharge end of the feed chuck.

Fig. 4 is an end view thereof.

Fig. 5 is a transverse sectional elevation thereof, on line 5—5, Fig. 3.

Fig. 6 is a similar view thereof, showing the feed chuck adapted for operation on stock of hexagonal cross sectional shape.

Fig. 7 is a similar sectional view showing a feed chuck adapted for operation on stock of square cross section.

In the embodiment of this invention shown in the drawings by way of example, 8 represents the tubular body member of a feed chuck. This body member is provided at the receiving end thereof with a threaded part 9 which is formed for threaded engagement with the usual feed tube which is advanced in the direction of its axis whenever the stock is to be fed forwardly. 10 represents a piece of stock with which my improved feed chuck may cooperate.

The body member 8 is provided at intervals about the periphery of the same with slots or cut-out portions 11 arranged intermediate of the ends of the body member. Any desired number of these slots may be provided, three being shown in the construction illustrated. Beyond the outer ends of these slots, the body member is provided at its discharge end with a part 12 of reduced diameter which is threaded on the exterior surface thereof.

The stock to be fed by the feed chuck is engaged by means of springs removably mounted on the body member and preferably arranged in the slots 11. These springs are bowed inwardly so that the middle portions 14 thereof extend toward the axis of the body into position to engage the stock. The inner end portions 15 of the springs may be secured in fixed relation to the body member in any suitable or desired manner, and in the construction shown for this purpose, slots or recesses 16 are formed in the body member at the inner ends of the slots into which the extremities of the end portions 15 may enter.

The other or outer ends 17 of the springs lie in longitudinally extending grooves formed in the reduced end portions 12 of the body 8. The extremities of the end portion 17 extend to a limited extent beyond this end of the body and the grooves in which these end portions 17 lie are of such depth as to be below the threads formed in the reduced end portion 12, so that these threads will be free to engage with corresponding internal threads formed on a nut or sleeve 20 so that this nut or sleeve may be freely threaded on this threaded end of the body member without interference with the end portions 17 of the springs.

The nut or sleeve 20 is formed to engage the outer ends of the springs and for this purpose in the construction shown, the nut or sleeve has an inwardly extending annular flange or bead 21 which forms a shoulder to engage the outer extremities of the end portions 17 of the springs. This flange is arranged near the outer end of the nut or sleeve, so that the threaded part of the sleeve overlies these ends of the springs and thus confines them to the grooves. It will thus be seen that when the sleeve 20 is turned so as to move to the left in Figs. 1 to 3, the flange 21 of the sleeve will exert inward pressure against the end portions 17 of the springs. This pressure will tend to bow the middle portion 14 thereof inwardly toward the axis of the body member, thus making it possible for the springs to either grip the stock more firmly or to move the parts 14 of the springs nearer to the axis of the body member to cooperate with stock of somewhat smaller sizes. By turning the sleeve 20 so as to move the same outwardly from the end of the body member, it will, of course, also be obvious that the stock engaging springs will have less pressure exerted on the same with the result that less press will be exerted on the stock, or if desired, the feed chuck may cooperate with stock of slightly larger diameter.

After the sleeve 20 has adjusted the springs for the stock with which it is to cooperate, so that the springs will grip the stock with the desired pressure, the sleeve will also be frictionally held in its adjusted position because of contact with the outer extremities of the ends 17 of the springs. Since these ends of the springs exert a yielding pressure against the sleeve, they will resist turning of the sleeve due to shocks or jars to which the feed chuck is subjected. Other means may be provided to hold the sleeve against turning.

The springs can readily be removed from the tubular body 8 by unscrewing the sleeve 20 from the end thereof, whereupon the springs may be lifted out of the grooves in the threaded end 12 of the body member and also withdrawn from the recesses 16. These springs can then be readily replaced by others when worn out or when it is desired to operate on stock of different size or shape. For example in Figs. 1 to 5, I have shown the springs with the stock contacting portions 14 thereof of arc-shaped cross section to cooperate with a round bar 10. If it is desired to operate upon hexagonal stock 24, as shown in Fig. 6, the springs may be provided with flat intermediate portions 25 formed to engage with three of the flat surfaces of hexagonal stock. When the feed chuck is to be used for feeding stock 30 of square cross section, the body member can be provided with two slots as shown in Fig. 7, to receive two springs 31 positioned to act on opposite faces of a square bar, or with four slots for receiving four springs.

The feed chuck described has the advantage that tension of the springs can be very easily adjusted by merely turning the nut or sleeve 20.

The feed chuck shown has the further advantage that it is inexpensive to produce and to maintain in operating condition, since the springs are relatively inexpensive to produce. In cases where wear is a problem, the springs may be plated with hard and wear-resistant materials.

By arranging the springs in slots as shown, they are held against rotation relatively to the body member 8, so that the work operated upon will not transmit rotative force to the adjusting sleeve 20, so that turning of this sleeve, which would result in varying the tension of the springs, will not result. Consequently, the spring pressure will remain substantially uniform unless manually changed. Furthermore, by arranging the springs in the slots as shown, the feed chuck can operate on work of larger diameter than in the case of feed chucks in which no slots are provided in the body member.

The springs 14 can be readily replaced so that the tubular body member of the feed chuck may be used repeatedly with different springs. The life of the body member is, consequently, very long, since it is not subject to any substantial amount of wear.

This application is a substitute for abandoned application 452,052, filed August 25, 1954.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A feed chuck including a tubular body member having a plurality of longitudinally extending slots arranged at intervals about the periphery thereof intermediate of the ends of said body member, a spring in each of said slots having one end fixed in an end of its slot and having its middle portion bowed into said body member, and means cooperating with said body member and with the other ends of said springs for further bowing said springs inwardly with reference to said body member to engage with stock within said body member.

2. A feed chuck according to claim 1, in which said body member has recesses at the ends of said slots in which the fixed ends of said springs seat.

3. A feed chuck according to claim 1, in which said means cooperating with said other ends of said springs is a sleeve having a threaded engagement with said body member and engaging said other ends of said springs.

4. A feed chuck according to claim 1, in which said means cooperating with said other ends of said springs is a sleeve having a threaded engagement with said body member and having an inwardly extending flange which engages said other ends of said springs.

5. A feed chuck according to claim 1, and in which said middle portions of said springs are of a cross sectional shape corresponding approximately to parts of the cross sectional shape of the stock to be fed.

6. A feed chuck including a tubular body member having a plurality of longitudinally extending slots arranged at intervals about the periphery thereof, a spring for each of said slots and having the middle portion thereof bowed to extend into said body member, said body member having recesses at the ends of said slots into which one end of each spring extends, said body member having the leading end thereof threaded, grooves in said threaded portion in which the other ends of said springs lie, and beyond which they extend, said grooves being of sufficient depth so that said last mentioned ends of said springs lie below the threads of said threaded end, and a threaded sleeve engaging said threaded end and having a part engaging said other ends of said springs to vary the extent to which said springs are bowed.

7. A feed chuck according to claim 6, in which said sleeve has a part overlying said other ends of said springs to retain them in said grooves and an inwardly extending flange engaging said other ends of said springs.

No references cited.